United States Patent
Guemmer

(10) Patent No.: US 8,100,630 B2
(45) Date of Patent: Jan. 24, 2012

(54) FLUID FLOW MACHINE WITH MULTI-FLOW ROTOR ARRANGEMENT

(75) Inventor: Volker Guemmer, Mahlow (DE)

(73) Assignee: Rolls-Royce Deutschland Ltd & Co KG (DE)

(*) Notice: Subject to any disclaimer, the term of this patent is extended or adjusted under 35 U.S.C. 154(b) by 471 days.

(21) Appl. No.: 12/382,253

(22) Filed: Mar. 11, 2009

(65) Prior Publication Data

US 2009/0245998 A1    Oct. 1, 2009

(30) Foreign Application Priority Data

Mar. 11, 2008    (DE) .......................... 10 2008 013 542

(51) Int. Cl.
*F01D 1/24*    (2006.01)
(52) U.S. Cl. ........................................................ 415/65
(58) Field of Classification Search ............... 415/66, 415/65, 69, 199.5, 169.1, 144, 58.8, 20; 60/612, 60/805, 226.1; 417/405, 407
See application file for complete search history.

(56) References Cited

U.S. PATENT DOCUMENTS

| | | | | |
|---|---|---|---|---|
| 3,729,957 A | * | 5/1973 | Petrie et al. | 60/226.1 |
| 4,005,575 A | * | 2/1977 | Scott et al. | 60/226.1 |
| 4,251,987 A | * | 2/1981 | Adamson | 60/805 |

* cited by examiner

*Primary Examiner* — Alexander Gilman
(74) *Attorney, Agent, or Firm* — Timothy J. Klima; Shuttleworth & Ingersoll, PLC

(57) ABSTRACT

A fluid flow machine includes at least one casing 1 and at least one rotor drum 3 rotatable about a machine axis 4, with stator vanes 8 and rotor blades 7 being arranged in an annulus duct 2 formed between the casing 1 and the rotor drum 3 The annulus duct 2 is divided into an outer annular duct 5 and an inner annular duct 6 by at least one annular flow divider 11, in each of which rotor blades 7 and stator vanes 8 are arranged Outer rotor blades 7a, which are arranged in the outer annular duct 5, are rotatable at a different speed than the inner rotor blades 7b, which are arranged in the inner annular duct 6.

17 Claims, 9 Drawing Sheets

Figure 1:
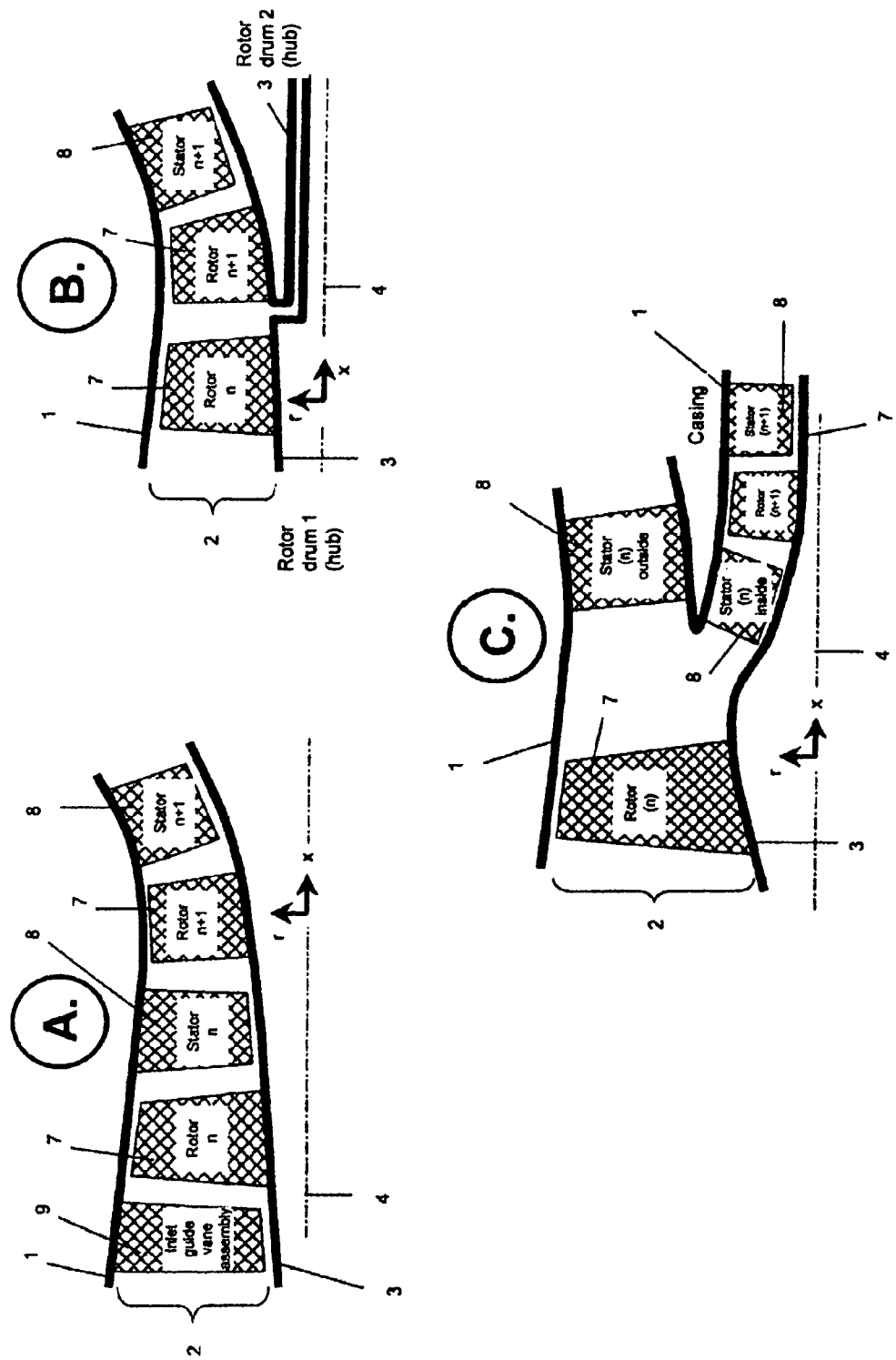

Fig. 1 State of the art

FLUID FLOW MACHINE WITH MULTI-FLOW ROTOR ARRANGEMENT

This application claims priority to German Patent Application DE102008013542.9 filed Mar. 11, 2008, the entirety of which is incorporated by reference herein.

This invention relates to a fluid flow machine.

The present invention relates to fluid flow machines, such as blowers, compressors, pumps and fans of the axial and semi-axial type with gaseous or liquid working medium (fluid). The fluid flow machine includes at least one stage, with each stage having a rotor with subsequent stator or a rotor only. The rotor includes a number of blades which are connected to a rotor drum and impart energy to the working medium. The rotor can be shrouded or shroudless at the outer blade end. A stator, if any, includes a number of stationary vanes which can be provided with a fixed or free blade end on the hub side and/or on the casing side. The rotor drum and the blading are enclosed by a casing. The machine may feature a stator upstream of the first rotor (inlet guide vane assembly). Instead of being fixed, the stators can be variable and provided with a spindle accessible from the outside of the annulus duct to accomplish this variation.

Performance and efficiency of fluid flow machines, such as blowers, compressors, pumps and fans, substantially depend on the variation of the flow conditions existing along the blade height between the flow path-confining hub and casing contours. This radial variation of the flow conditions is very pronounced and unfavorable if the hub radius is very small in relation to the casing radius of a—rotor or stator—blade row.

On fluid flow machines according to the state of the art, the mass flow to be delivered moves within and along a single flow path which usually has the shape of an annulus duct. An input of energy to the fluid via the rotors here takes place over the entire annulus duct height by a radially undivided rotor blade row, see FIG. 1, top. Some solutions according to the state of the art provide for a non-returning bypass duct containing no rotors, see FIG. 1, bottom.

On the rotors, the radial variation of the flow conditions is closely related to the local airfoil speed of the blades which, given the speed of the rotor shaft, significantly increases from the hub to the casing and, while being favorably selectable for the area of the center section of the rotor, is much too low on the hub and much too high on the casing. Consequently, significant losses concerning the efficiency and the operating range of the rotor are to be noted, particularly near the hub and the casing. Furthermore, the fluid mass flow deliverable by the machine per unit of cross-sectional area is frequently limited by high inflow mach numbers in the rotor tip area.

Reference is to be made to DE OS 1 526 815 which comes closest to the state of the art. The Publication shows an annulus duct in which an outer annular duct and an inner annular duct are formed by an annular flow divider. The rotor blades disposed in the respective annular ducts are fixedly connected to each other and driven at the same speed.

A broad aspect of the present invention is to provide a fluid flow machine of the type specified at the beginning above, which, while being simply designed and cost-effectively producible, can be optimized in terms of flow conditions and adapted to the most different operating conditions.

The present invention therefore provides for the outer rotor blades and the inner rotor blades or the outer rotor blade row and the inner rotor blade row, respectively, to be driven at different speeds. According to the present invention, the drive can have a constant speed ratio or a variable speed ratio. Therefore, the present invention advantageously enables an optimized adaptation to the most different operating parameters to be obtained.

The multi-flow rotor arrangement according to the present invention provides for a significant increase of the frontal area-related mass flow of a fluid flow machine and, in application to the fan of an aircraft engine, an increase in efficiency of approx. 2 percent. When using this concept in the compressor of an aircraft engine with approx. 25,000 pound thrust, an immediate reduction of the specific fuel consumption of at least 1 percent is achieved.

More particularly, the present invention accordingly relates to a fluid flow machine with at least one section of a flow path in which, starting out from a single-flow annulus duct, a division of the fluid flow into at least two concentrically arranged partial annular ducts (an outer annular duct and an inner annular duct) is provided, with each partial fluid flow, in its further course, passing at least one blade row of rotors and with at least two rotor blade rows being provided in different partial annular ducts and arranged adjacently to each other.

The fluid flow machine can advantageously be provided such that:

a) at least two rotor blade rows provided in different partial annular ducts partly or completely overlap each other in the axial direction, b) the rotor drum to which a rotor blade row disposed in a partial annular duct is connected forms the enclosure of another rotor blade row disposed in a further inward partial annular duct and, thus, the rotor drum is flown by fluid on both the inside and the outside, c) at least two rotor blade rows provided in different partial annular ducts are driven by separate shafts or, if driven by a single shaft, are coupled to each other by means of a gearbox to obtain different speeds and, in particular, the speeds have the same ratio as the mean exit radii of the rotor blade rows concerned, d) at least one of the partial annular ducts is designed such that—in the area upstream of a rotor or a stator blade row—the cross-sectional area increases in the direction of flow (diffuser), e) at least two rotor blade rows provided and adjacently arranged in different partial annular ducts partly overlap each other in the radial direction in such a manner that the leading-edge hub radius of the further outward rotor is smaller than the leading-edge blade tip radius of the further inward rotor, f) an arrangement is made for at least two rotor blade rows provided in different partial annular ducts to rotate in the same or in opposite directions.

Figure 3:
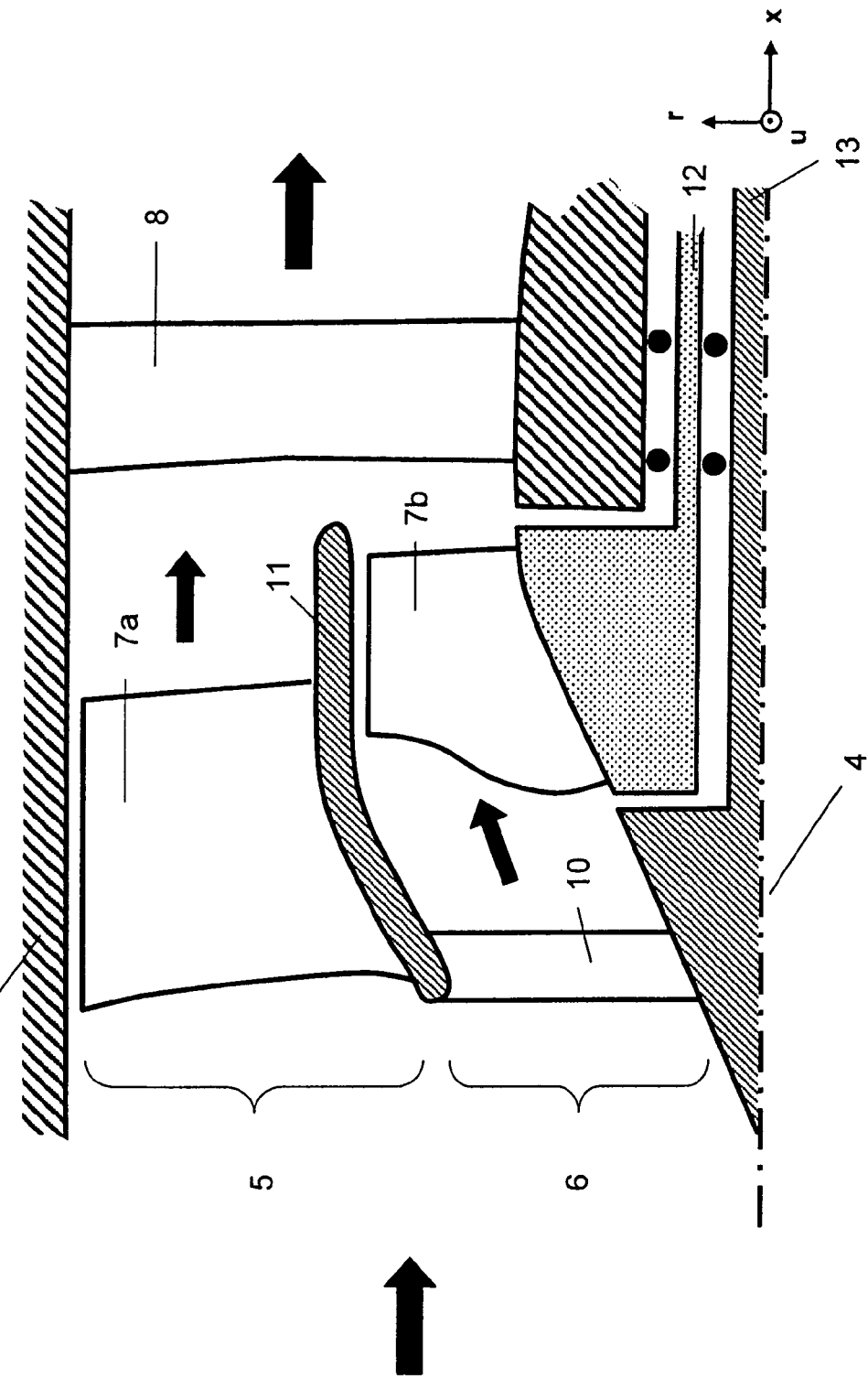
Figure 4:
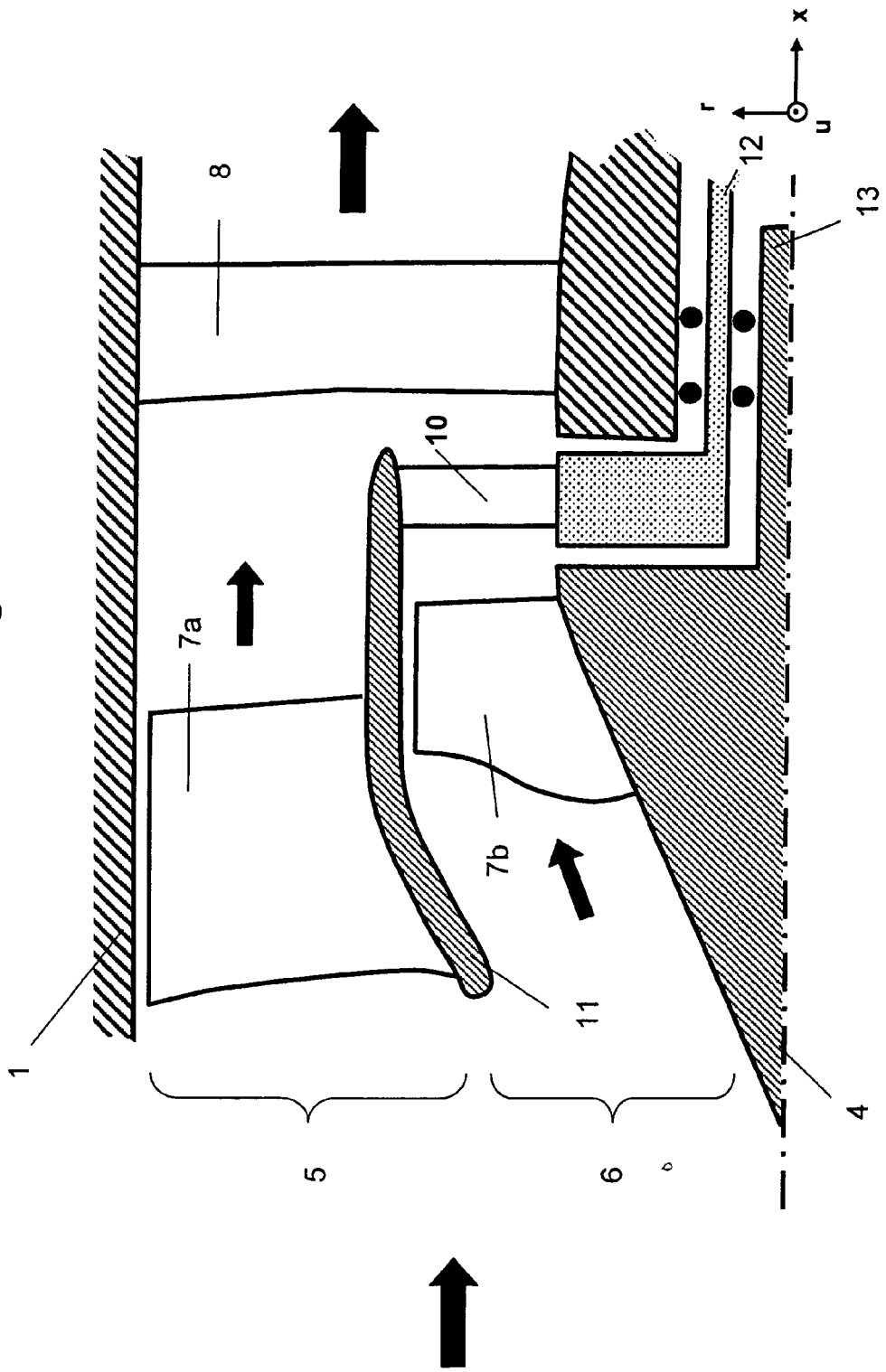
Figure 5:
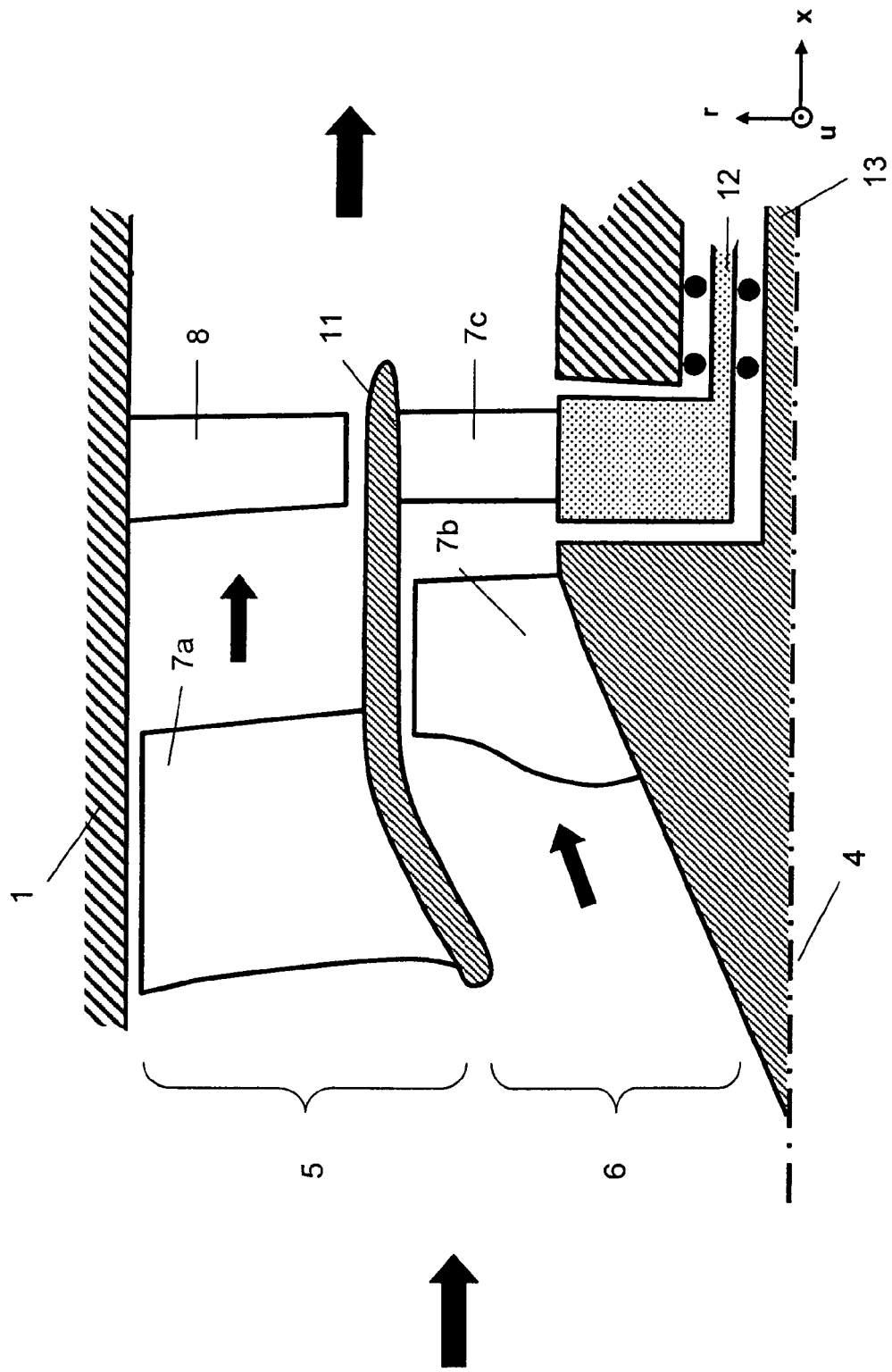
Figure 6:
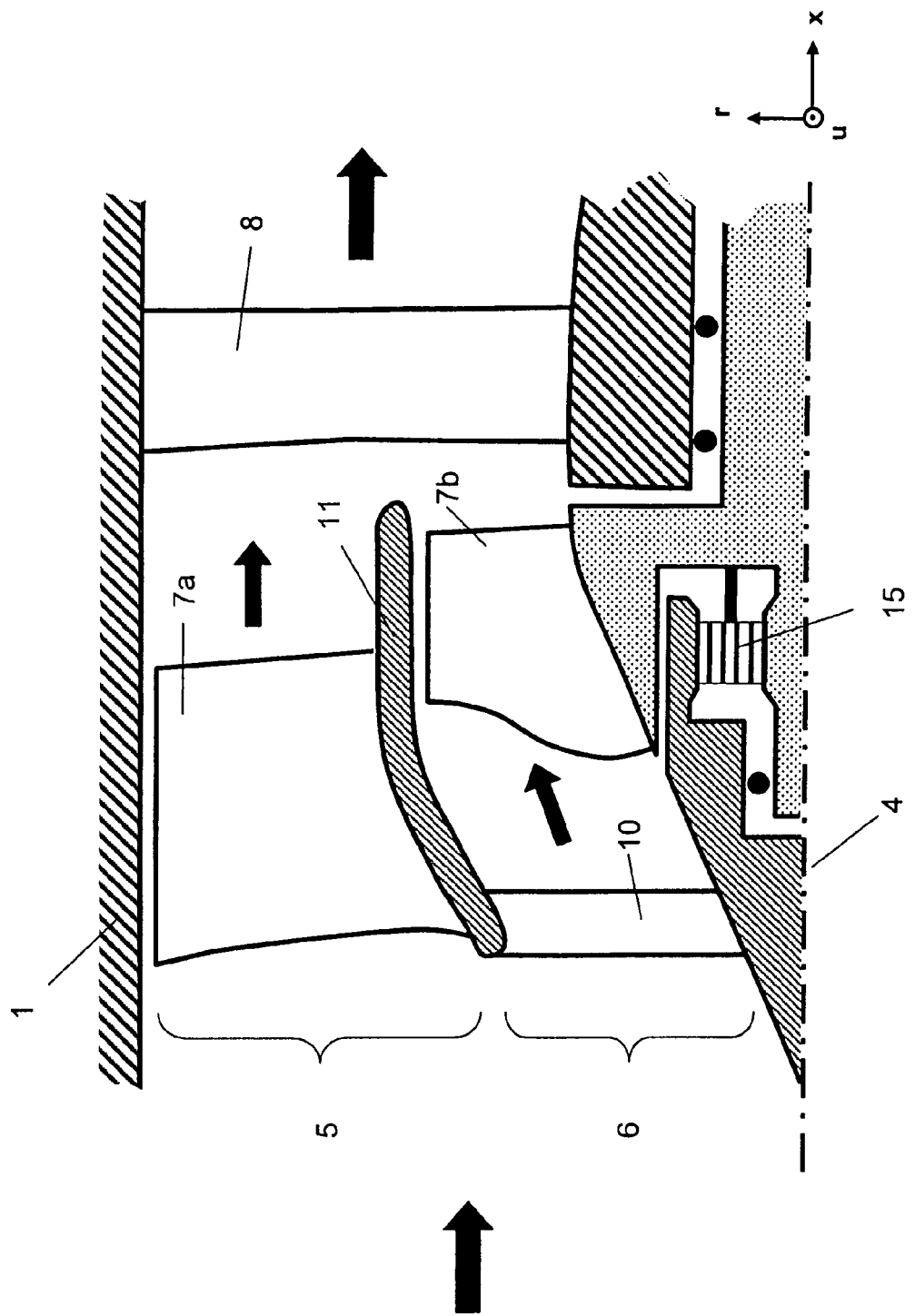
Figure 7:
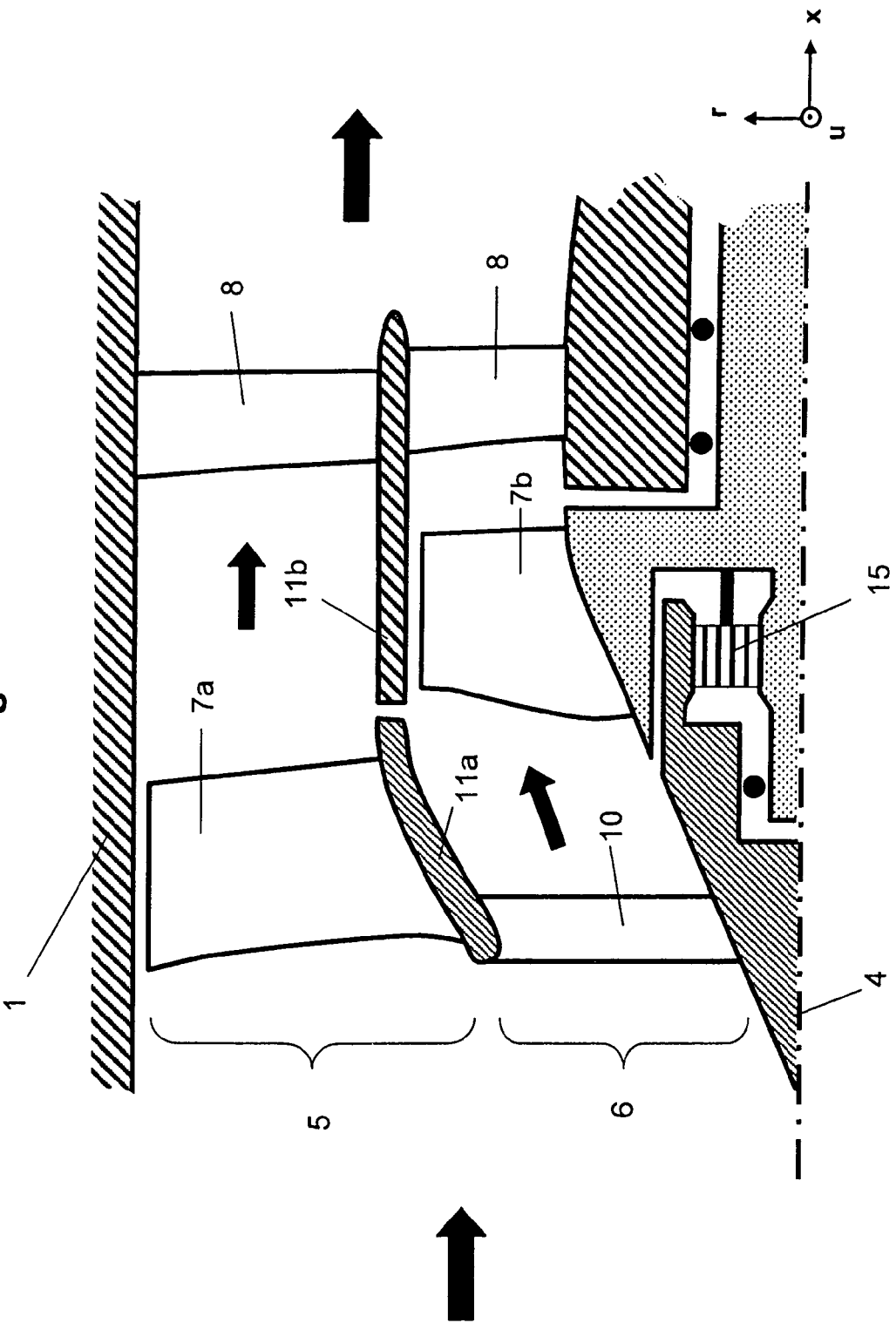
Figure 8:
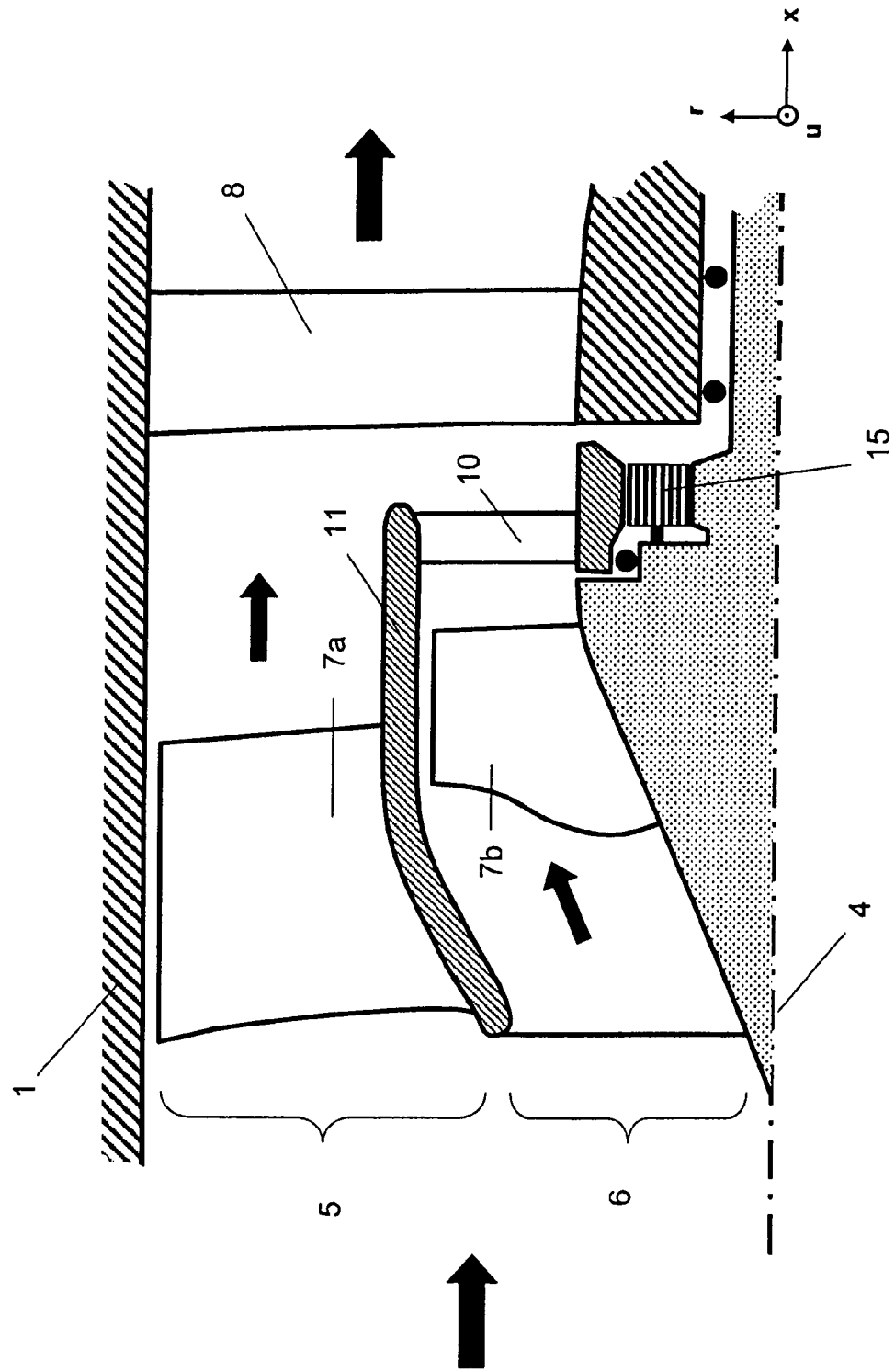
Figure 9:
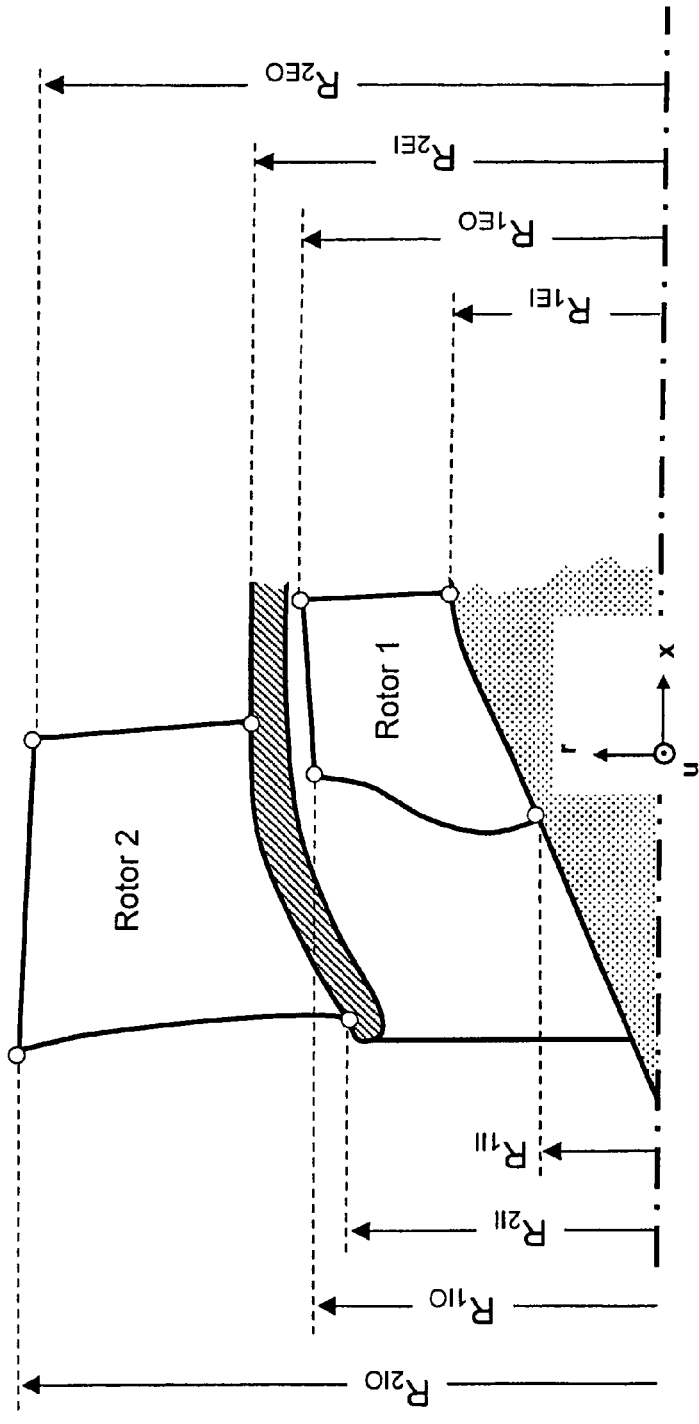

The present invention is more fully described in light of the accompanying drawings showing preferred embodiments. In the drawings, FIG. 1 (Prior Art) shows fluid flow machines in accordance with the state of the art, FIG. 2 shows a rotor configuration with two drive shafts in accordance with the present invention, FIG. 3 shows a further rotor configuration with two drive shafts in accordance with the present invention, FIG. 4 shows a further rotor configuration with two drive shafts in accordance with the present invention, FIG. 5 shows a further rotor configuration with two drive shafts in accordance with the present invention, FIG. 6 shows a rotor configuration with reduction gear in accordance with the present invention, FIG. 7 shows a further rotor configuration with reduction gear in accordance with the present invention, FIG. 8 shows a further rotor configuration with reduction gear in accordance with the present invention, and FIG. 9 shows a rotor configuration in accordance with the present invention, dimensions.

FIG. 1 is a simplified representation of a state-of-the-art fluid flow machine in an embodiment provided by the present invention. Provision is here made that the annulus duct is varied in height, the flow path of the annulus duct is divided by a branching arrangement or the rotor blade rows axially arranged behind each other are driven at different speeds.

Figure 2:
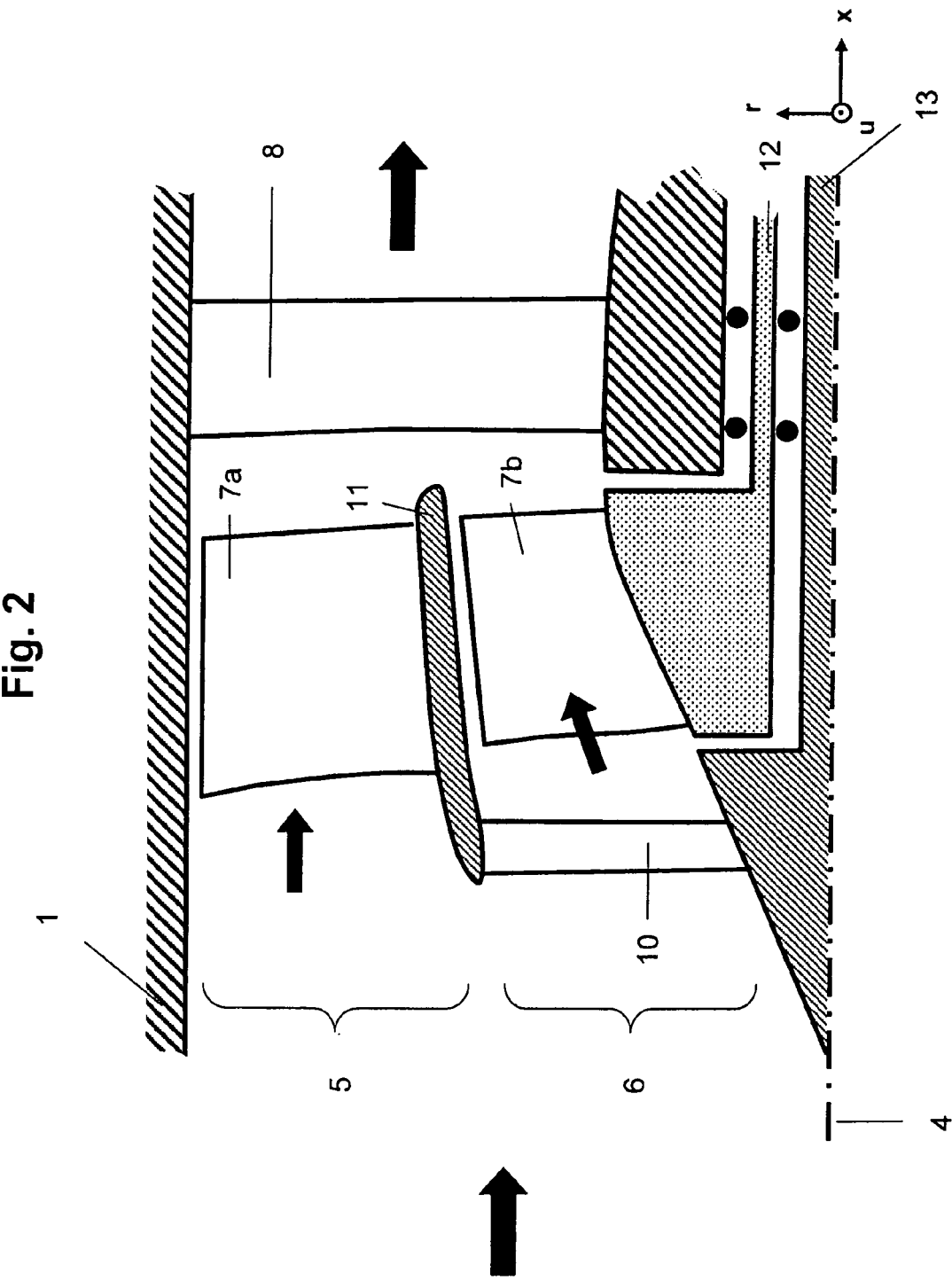

FIG. 2 shows a section of a fluid flow machine according to the present invention with a multi-flow rotor arrangement enclosed by a casing 1. A two-flow configuration is here shown which however is easily extendable to a configuration with, for example, three or more partial flows by repeating the concept applied for the creation of the two-flow configuration while still falling within the scope of the present invention.

As indicated by a bold arrow, the main fluid flow conveyed in a one-flow section of the annulus duct approaches from the left-hand side. In its further course, the main fluid flow is divided into two partial fluid flows, each of which is conveyed in a partial annular duct 5 or 6, and with each partial fluid flow, in its further course, being supplied with energy by an individual row of rotor blades. The inner partial fluid flow passes the rotor blade row 7b, while the outer partial fluid flow passes the rotor blade row 7a. The drum 11 of the outer rotor 7a provides for a division between the partial fluid flows, i.e. it forms a rotating casing, or a rotating enclosure, of the inner rotor blade row 7b. Downstream of the rotors 7b and 7a, the partial fluid flows are re-united. At least one stator 8 can, as exemplified here, be arranged in the already re-united fluid flow or in one of the partial fluid flows.

The radially inner rotor blade row 7b and the radially outer rotor blade row 7a are disposed adjacently to each other, and in the case here shown, even situated largely in the same area in relation to the meridional flow direction.

In the representation according to the present invention here selected, each partial-flow rotor row is driven by a separate shaft 12 or 13, with the shafts being rotatable at different speeds.

For power transmission from the inner drive shaft 13 to the drum 11 of the outer rotor blade row 7a, a row of profiled or non-profiled struts 10, or also blades, is provided which, in the example here shown, are situated upstream of the inner rotor.

Quite similar to FIG. 2, FIG. 3 shows a section of a fluid flow machine according to the present invention with a multi-flow rotor arrangement. Also in this case, the main fluid flow in its course is divided into two partial fluid flows and the drum of the outer rotor 7a separates the partial fluid flows. However, the inner rotor blade row 7b and the outer rotor blade row 7a, while being adjacently arranged in the solution according to the present invention here shown, are offset in relation to the meridional flow direction. The section of the inner partial annular duct 6 situated before the rotor 7b is here diffuser-like, i.e. has a cross-sectional area which increases in the direction of flow. In a particularly favorable embodiment according to the present invention, the leading edge of the drum of the rotor 7a, which forms the outer confinement of the inner partial annular duct, can be radially further inward than the blade tip of the rotor 7b.

Quite similar to FIG. 3, FIG. 4 shows the section of a fluid flow machine with multi-flow rotor arrangement according to the present invention. However, power transmission from the drive shaft to the drum of the outer rotor blade row 7a is, in the solution according to the present invention here shown, accomplished by a row of struts or blades 10, which are provided downstream of the rotor 7b.

Quite similar to FIG. 4, FIG. 5 shows the section of a fluid flow machine with multi-flow rotor arrangement according to the present invention. However, power transmission from the drive shaft 12 to the drum 11 of the outer rotor blade row 7a is, in the solution according to the present invention here shown, accomplished by a row of blades (rotor 7c) which, like the rotor 7a, rotate counter-directionally to rotor 7b. Thus, a stator row, while not being required behind rotor 7c, is necessary behind rotor 7a.

Similar to FIG. 3, FIG. 6 shows the section of a fluid flow machine with multi-flow rotor arrangement according to the present invention. However, power transmission is, in the solution according to the present invention here shown, accomplished by a single drive shaft which not only drives the rotor 7b at the same speed, but also the rotor 7a via a gearbox 15. Accordingly, the speeds of the rotors 7b and 7a have a fixed ratio during operation. Advantageous in accordance with the present invention is a speed reduction from rotor 7b to rotor 7a. In accordance with the present invention, it is particularly advantageous if the reduction ratio U essentially corresponds to the ratio of the mean exit radii (see R1EM and R2EM in FIG. 9), i.e. RM=R2EM/R1EM (R2 refers to the rotor 7a, while R1 refers to the rotor 7b).

FIG. 7 shows a similar inventive solution as FIG. 6. However, the inner rotor blade row 7b and the outer rotor blade row 7a, while being adjacently arranged, do not overlap in relation to the meridional flow direction or the axial direction. Here, the inner rotor blade row 7b can, in lieu of the drum of the rotor blade row 7b, be enclosed by a stationary casing 1 connected to at least one downstream strut or stator blade row.

FIG. 8 shows a solution according to the present invention similar to FIG. 6. Here again, the rotor blade row 7a is driven via a gearbox 15 which, however, is arranged such that the connection to the drum of the rotor blade row 7a can be made via a row of struts 10 or blades disposed downstream of the rotor blade row 7b.

LIST OF REFERENCE NUMERALS

1 Casing/stationary structure
2 Annulus duct
3 Rotor drum/drum/hub
3a Rotor drum/drum/hub for outer rotor blade 7a
3b Rotor drum/drum/hub for inner rotor blade 7b
4 Machine axis
5 Outer (partial) annular duct
6 Inner (partial) annular duct
7 Rotor blade/rotor blade row
7a Outer rotor blade/outer rotor blade row
7b Inner rotor blade/inner rotor blade row
7c Rotor
8 Stator vane/stator vane row
9 Inlet guide vane assembly
10 Strut
11 Flow divider
12 Drive shaft
13 Drive shaft
14 Drive shaft
15 Gearbox

What is claimed is:

1. A fluid flow machine, comprising:
at least one casing;
at least one rotor drum rotatable about a machine axis;
an annulus duct formed between the casing and the rotor drum;

at least one annular flow divider dividing the annulus duct into an outer annular duct and an inner annular duct;

a plurality of outer rotor blades positioned in the outer annular duct and a plurality of inner rotor blades positioned in the inner annular duct, wherein, the outer rotor blades positioned in the outer annular duct are rotatable at a different speed than the inner rotor blades positioned in the inner annular duct;

wherein the inner and outer rotor blades partly overlap in an axial direction.

2. The fluid flow machine of claim 1, and further comprising a gearbox coupling the outer rotor blades arranged in the outer annular duct and the inner rotor blades arranged in the inner annular duct such that a single drive shaft can drive the outer and the inner rotor blades at different speeds.

3. The fluid flow machine of claim 2, wherein, a ratio between the different speeds of the outer rotor blades and the inner rotor blades corresponds to a ratio of a mean exit radii of the rotor blade rows formed by the outer rotor blades and the inner rotor blades.

4. The fluid flow machine of claim 3, wherein at least one of the annular ducts in an area upstream of a rotor blade includes an expanding cross-sectional area in the direction of flow.

5. The fluid flow machine of claim 4, wherein the wherein the inner and outer rotor blades completely overlap in an axial direction.

6. The fluid flow machine of claim 3, wherein adjacently arranged rotor blade rows of the rotor blades at least partly overlap in a radial direction to such an extent, that a leading edge hub radius of the radially outward rotor is smaller than a leading edge blade tip radius of the radially inward rotor.

7. The fluid flow machine of claim 3, wherein one of the outer rotor blades or the inner rotor blades are attached to the rotor drum, and the rotor drum forms the annular flow divider, outwardly enclosing the inner rotor blade, the rotor drum being flown by fluid, on both a radially outer side and a radially inner side thereof.

8. The fluid flow machine of claim 3, wherein at least two rotor blade rows arranged in different annular ducts have a same direction of rotation.

9. The fluid flow machine of claim 3, wherein at least two rotor blade rows arranged in different annular ducts have an opposite direction of rotation.

10. The fluid flow machine of claim 1, and further comprising a first drive shaft for driving the outer rotor blades arranged in the outer annular duct and a second drive shaft for driving the inner rotor blades arranged in the inner annular duct.

11. The fluid flow machine of claim 10, wherein, a ratio between the different speeds of the outer rotor blades and the inner rotor blades corresponds to a ratio of a mean exit radii of the rotor blade rows formed by the outer rotor blades and the inner rotor blades.

12. The fluid flow machine of claim 11, wherein at least one of the annular ducts in an area upstream of a rotor blade includes an expanding cross-sectional area in the direction of flow.

13. The fluid flow machine of claim 12, wherein the wherein the inner and outer rotor blades completely overlap in an axial direction.

14. The fluid flow machine of claim 11, wherein adjacently arranged rotor blade rows of the rotor blades at least partly overlap in a radial direction to such an extent, that a leading edge hub radius of the radially outward rotor is smaller than a leading edge blade tip radius of the radially inward rotor.

15. The fluid flow machine of claim 11, wherein one of the outer rotor blades or the inner rotor blades are attached to the rotor drum, and the rotor drum forms the annular flow divider, outwardly enclosing the inner rotor blades, the rotor drum being flown by fluid, on both a radially outer side and a radially inner side thereof.

16. The fluid flow machine of claim 11, wherein at least two rotor blade rows arranged in different annular ducts have a same direction of rotation.

17. The fluid flow machine of claim 11, wherein at least two rotor blade rows arranged in different annular ducts have an opposite direction of rotation.

\* \* \* \* \*